(12) United States Patent
Jenkins et al.

(10) Patent No.: US 10,579,111 B1
(45) Date of Patent: Mar. 3, 2020

(54) HEAT MANAGEMENT DEVICE FOR EYECUP ASSEMBLIES OF HEAD MOUNTED DISPLAYS

(71) Applicant: Facebook Technologies, LLC, Menlo Park (CA)

(72) Inventors: Kurt Jenkins, Sammamish, WA (US); Mark Shintaro Ando, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/402,961

(22) Filed: May 3, 2019

(51) Int. Cl.
*G06F 1/20* (2006.01)
*G02B 27/01* (2006.01)

(52) U.S. Cl.
CPC ........... *G06F 1/20* (2013.01); *G02B 27/0176* (2013.01); *G02B 2027/0161* (2013.01)

(58) Field of Classification Search
None
See application file for complete search history.

(56) References Cited

U.S. PATENT DOCUMENTS

| | | | |
|---|---|---|---|
| 9,229,216 B2* | 1/2016 | Staley, III | F41G 1/383 |
| 9,839,166 B2* | 12/2017 | Kim | H05K 7/20972 |
| 2008/0122736 A1* | 5/2008 | Ronzani | G02B 27/017 |
| | | | 345/8 |
| 2017/0090514 A1* | 3/2017 | Byun | G06F 1/166 |
| 2017/0102767 A1* | 4/2017 | Kim | G06F 3/013 |
| 2017/0255015 A1* | 9/2017 | Geng | G02B 6/0008 |
| 2018/0097920 A1* | 4/2018 | Hoellwarth | G02B 27/017 |

* cited by examiner

*Primary Examiner* — Courtney L Smith
(74) *Attorney, Agent, or Firm* — Fenwick & West LLP

(57) ABSTRACT

A head mounted display system (HMD) includes an eyecup, an optical assembly, a backlit electronic display, and a heat management device. The heat management device couples to the eyecup on a first side and couples to the electronic display on a second side. The heat management device includes a heat dissipation structure to dissipate heat generated by the electronic display, as well as an insulating structure to thermally insulate the eyecup from the electronic display and the optical assembly.

20 Claims, 13 Drawing Sheets

HEAT MANAGEMENT DEVICE FOR EYECUP ASSEMBLIES OF HEAD MOUNTED DISPLAYS

BACKGROUND

The present disclosure generally relates to heat management systems, and specifically to heat management devices for eyecup assemblies of a head mounted display (HMD).

Heat management devices function to transfer heat from a heat source, or otherwise maintain a thermal state of an object in a desired manner. In the context of a HMD, heat management devices conventionally are used to prevent overheating of processors. However, a HMD can also include optical components that are sensitive to temperature (e.g., causing changes in focus). And in some instances, heat produced by components of the HMD can cause changes in optical components that negatively impact the quality of images being presented to a user of the HMD.

SUMMARY

A heat management device for use in, e.g., a head mounted display (HMD). The HMD includes an eyecup assembly for one or both eyes. An eyecup assembly provide image light to an eyebox (e.g., location of an eye while a user wears the HMD). The eyecup assembly includes an electronic display element, the heat management device, an eyecup, and an optical assembly. The electronic display element generates image light, and in generating the image light also generates some level of heat.

The heat management device provides heat management for the electronic display element. The heat management device includes a body, that include a first side and a second side that is opposite to the first side. The electronic display element is coupled to a first side of the heat management device. The heat management device provides heat management by, e.g., dissipating at least some of the heat produced by the electronic display element as well as helping to thermally insulate the electronic display element from other components that may be sensitive to temperature. The body is formed such that there is an aperture between a portion of the first side and the second side. The body includes a display coupling region, a dissipation structure, and an insulating structure. The display coupling region is on the second side of the body, the display coupling region configured to couple the heat management device to the electronic display. The heat dissipation structure is adjacent to at least a portion of the display coupling region, and is configured to dissipate heat generated by the electronic display. The insulating structure is on the first side of the body. The insulating structure is configured to couple to the eyecup in a manner such that it receives light from the electronic display through the aperture. The insulating structure is configured to thermally insulate an eyecup (and the optical assembly coupled to the eyecup) from the electronic display.

In some embodiments, a method for forming a heat management device is disclosed. The method includes forming a monolithic body that includes a first side and a second side that is opposite to the first side, and an aperture between a portion of the first side and second side. Forming the monolithic body includes forming a display coupling region on the second side of the body, a heat dissipation structure adjacent to at least a portion of the display coupling region, and an insulating structure on the first side of the body. The display coupling region is configured to couple the heat management device to the electronic display within the eyecup assembly. The heat dissipation structure is configured to dissipate heat generated by the electronic display. The insulating structure is configured to thermally insulate the eyecup, and couple to the eyecup in a manner such that the eyecup receives light from the electronic display, through the monolithic body's aperture.

Figure 1A:
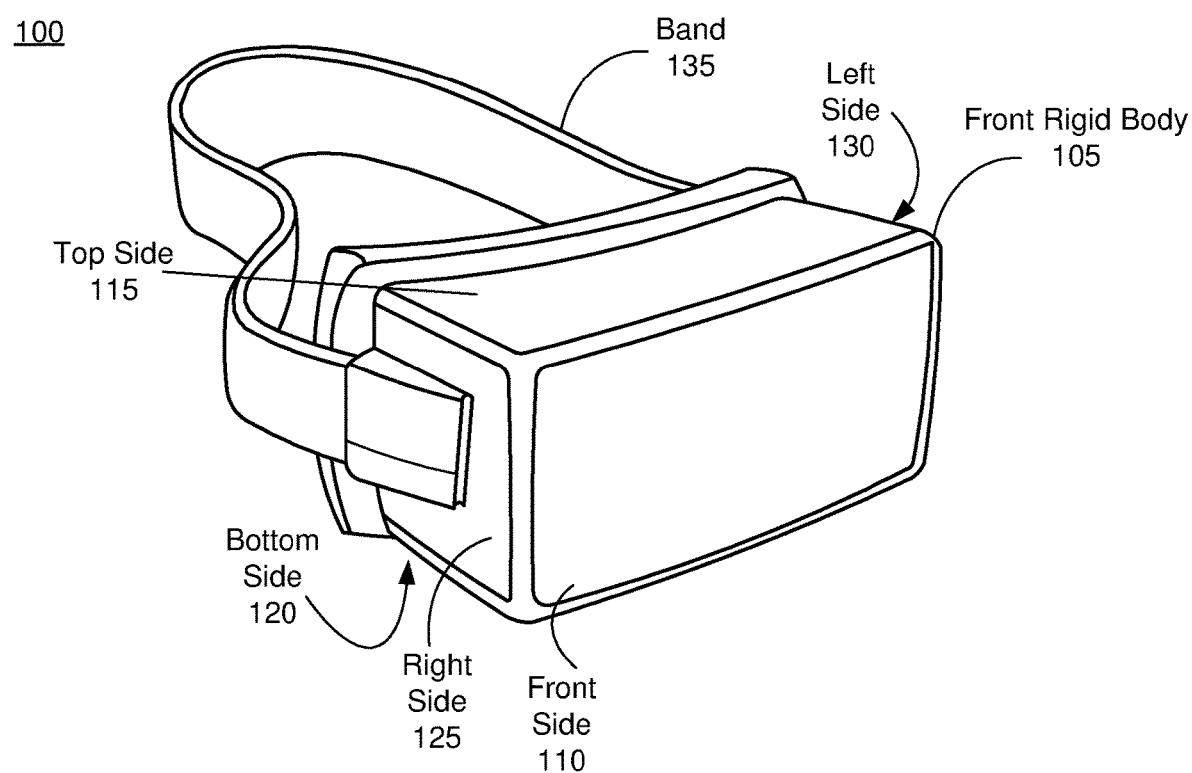
FIG. 1A is a wire diagram of a HMD, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A heat management device for use in, e.g., a HMD. The HMD includes an eyecup assembly for one or both eyes. An eyecup assembly provides image light to an eyebox (e.g., location of an eye while a user wears the HMD). The eyecup assembly includes an electronic display element, the heat management device, an eyecup, and an optical assembly.

The electronic display element generates image light, and in generating the image light also generates some level of heat. For example, the electronic display element may be a liquid crystal display that is backlit with a light source. A byproduct of powering the LCD and the light source is heat.

The heat management device provides heat management for the electronic display element. The heat management device includes a body, that include a first side and a second side that is opposite to the first side. The electronic display element is coupled to a first side of the heat management device. The heat management device provides heat management by, e.g., dissipating at least some of the heat produced by the electronic display element as well as helping to thermally insulate the electronic display element from other components that may be sensitive to temperature. The body is formed such that there is an aperture between a portion of the first side and the second side. The body includes a display coupling region, a dissipation structure, and an insulating structure. The display coupling region is on the second side of the body, the display coupling region configured to couple the heat management device to the electronic display. The heat dissipation structure is adjacent to at least a portion of the display coupling region, and is configured to dissipate heat generated by the electronic display. The insulating structure is on the first side of the body. The insulating structure is configured to couple to the eyecup in a manner such that it receives light from the electronic display through the aperture. The insulating structure is configured to thermally insulate an eyecup from the electronic display.

The eyecup is a structure that provides the image light exiting the aperture of the heat management device to the optical assembly. The eyecup includes a base portion and a top portion. The base portion couples to the insulating structure, and the top portion couples to a portion of the optical assembly. The eyecup is configured to receive the image light through the base portion.

The optical assembly directs the image light toward the eyebox. The optical assembly includes one or more optical elements (e.g., lenses). One or more of the optical elements may be sensitive to changes in temperature. For example, a shape of an optical element, a coating of an optical element, etc., may operate to specification over a certain range of temperatures.

The heat management device mitigates the heat generated by the electronic display from the components of the eyecup assembly. Thermal insulation and heat dissipation structures on the heat management device thermally insulate and direct heat away from the other components, ensuring that heat sensitive components maintain their intended structure and function. Additionally, the heat management device may provide structural support for the eyecup assembly, mitigating components from hitting the optical assembly if the head mounted display is dropped.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

System Overview

FIG. 1A is a wire diagram of a HMD 100, in accordance with one or more embodiments. The HMD 100 includes a front rigid body 105, with a front side 110, top side 115, bottom side 120, right side 125, and left side 130, and a band 135. The front rigid body 105 functions as a frame for the HMD 100 and includes at least one eyecup assembly, e.g., as discussed in detail below with regard to FIG. 1B. In one embodiment, one or more of the sides of the front rigid body 105 may be partially or fully transparent. For example, for use in artificial reality or mixed reality applications, the front side 110 of the front rigid body 105 may be partially transparent.

Figure 1B:
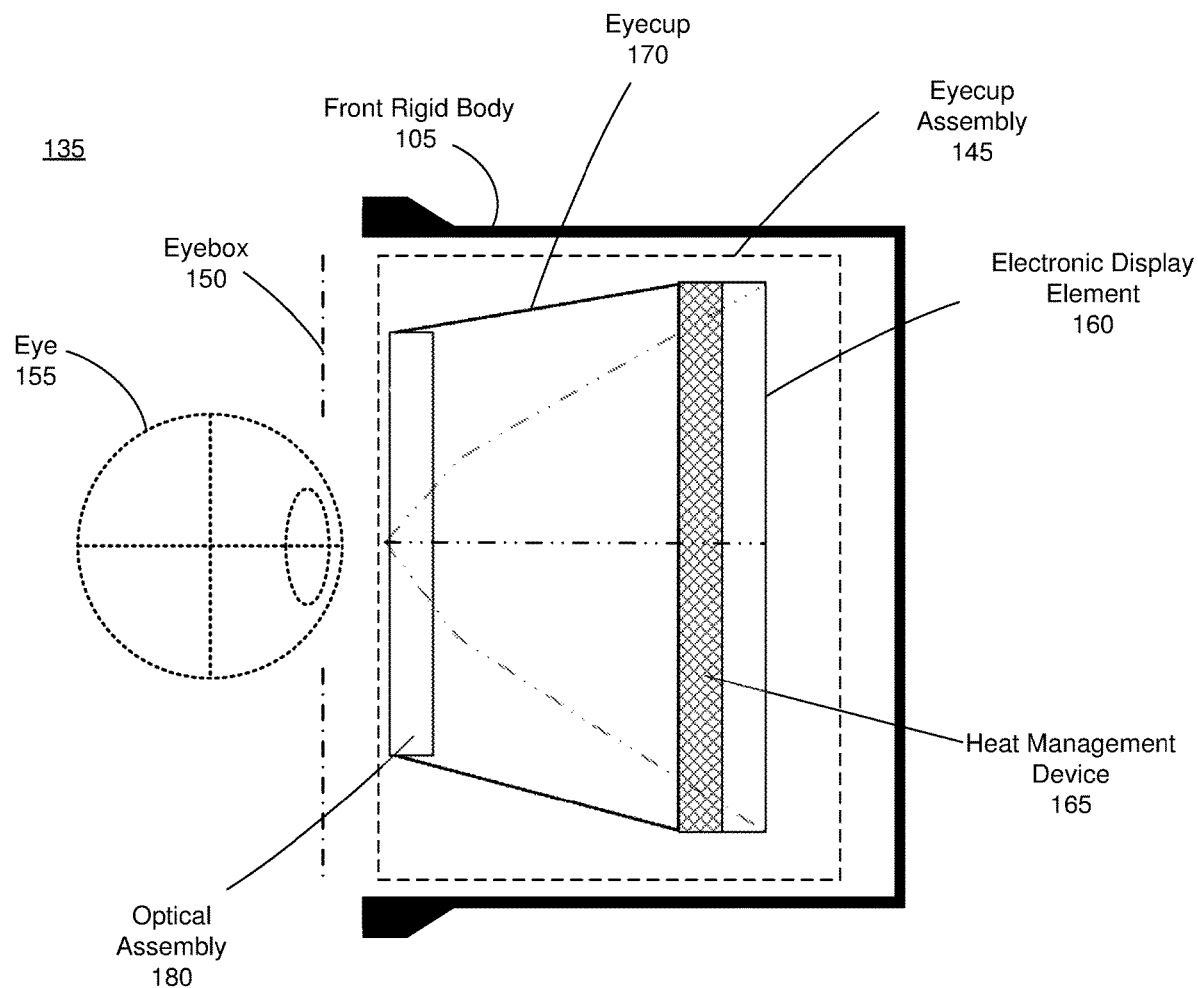
FIG. 1B illustrates a cross sectional view of a front rigid body of the HMD shown in FIG. 1A, including a heat management device, in accordance with one or more embodiments.

FIG. 1B illustrates a cross sectional view 135 of the front rigid body 105 of the HMD 100 shown in FIG. 1A, in accordance with one or more embodiments. The front rigid body 105 includes an eyecup assembly 130.

The eyecup assembly 145 provides image light to an eyebox 150. The eyebox 150 is a region occupied by an eye 155 of a user wearing the HMD 100. The eyecup assembly 145 includes an electronic display element 160, a heat management device 165, an eyecup 170, and an optical assembly 180. For purposes of illustration, FIG. 1B shows a cross section 135 associated with a single eye 155, but another eyecup assembly, separate from the eyecup assembly 145, may provide image light to another eye of the user.

The electronic display element 160 generates image light for presentation to the user of the HMD 100. The electronic display 160 also generates some level of heat as a byproduct of its operation. The electronic display 160 may comprise a single electronic display panel or multiple electronic display panels (e.g., a display for each eye of the user). Examples of the electronic display element 160 include: a liquid crystal display (LCD), an organic light emitting diode (OLED) display, an active-matrix organic light-emitting diode display (AMOLED), a quantum organic light emitting diode (QOLED) display, a quantum light emitting diode (QLED) display, a transparent organic light emitting diode (TOLED) display, some other display, or some combination thereof. The electronic display element 160 may include a backlight. For example, the electronic display element may include an LCD that is backlit with one or more sources to produce image light.

The heat management device 155 provides heat management for the HMD 100. The heat management device 155 mitigates heat generated by the electronic display 145, such as by dissipating at least some of the heat generated by the electronic display 145. The heat management device 155 also thermally insulates other components (e.g., the optical assembly 165) of the eyecup assembly 130, which may be sensitive to heat, from the display element 145.

As shown in FIG. 1B, the heat management device 165 may be positioned adjacent to, and/or coupled with, the electronic display 160, in accordance with one or more embodiments. The heat management device 165 includes a body, including a first side and a second side. The body is formed such that the second side of the body is opposite the first side, with an aperture in between the first and second sides. The aperture allows light from the electronic display element 160 to pass through an eyecup, to the optical assembly 180. The body includes a heat dissipation structure and an insulating structure that couples to the eyecup. The heat management device 165 couples to the electronic display 160. Components of the HMD 100 may be coupled to one another by compression, adhesive, or mechanical fasteners. The heat management device 165 is discussed in further detail below with respect to FIGS. 2A-6.

The heat management device 165 may be manufactured using three-dimensional (3D) printing. In some embodiments, the heat management device 165 may be printed to form a single monolithic structure. In other embodiments, one or more components of the heat management device 165 are printed individually and are coupled together and/or to other components to form the heat management device 165. Some or all of the heat management device 165 (e.g., the body) may be formed of a rigid, printable material, such as powdered metal or plastic. In embodiments, the 3D printing process may include a selective laser melting (SLM) or direct metal laser sintering (DMLS) system. A computer-aided design (CAD) system may communicate with the 3D printing system. The 3D printing system may include a print bed coupled to an actuator, a metal powder depositor that provides and distributes metal powder across the print bed (e.g., using a roller), and a heat generator (e.g., laser, electron beam source, etc.) coupled to an actuation system that moves the heat generator relative to the print bed during a build process. Other entities may perform some or all of the steps of the method in other embodiments. Likewise, embodiments may include different and/or additional steps, or perform the steps in different orders.

The eyecup 170 provides the image light generated by the electronic display 160 to the optical assembly 180. The image light travels from the electronic display 160, through the heat management device 165 through the eyecup 170, and finally to the optical assembly 180. The eyecup 170 couples to the heat management device 165 on one end and couples to the optical assembly 180 on another end. The eyecup 170 may be shaped as a frustrum (e.g., frustoconical) and formed from opaque material. The eyecup 170 may be formed from a material that is a thermal insulator. In some embodiments, the eyecup 170 is formed of the same structure as the insulating structure of the heat management device. The eyecup 170's interior may absorb visible light and may have one or more coatings, such as an anti-reflective coating, or one or more structural features (e.g., baffles) that reduce an amount of stray light within the eyecup 170.

The optical assembly 180 directs the image light, generated by the electronic display 160, toward the eyebox 150. The optical assembly may magnify received image light, correct optical errors associated with the image light (e.g., distortion, astigmatism, etc.), and/or present the image light to the user's eye 155. The optical assembly 180 may include one or more optical elements, such as an aperture, a Fresnel lens, a convex lens, a concave lens, a filter, a polarized lens, or any other suitable optical element that affects the image light emitted from the electronic display 160. One or more surfaces of the one or more optical elements may be flat, curved (e.g., spherical, aspherical, cylindrical, freeform, etc.), or some combination thereof. Additionally, one or more of the optimal elements may be coated. E.g., a surface of an optical element may be coated with a polarizer, a quarter waveplate, a halfwave plate, a partially reflective coating, etc. In some embodiments, the optical assembly includes a plurality of optical elements that form a folded optical system (e.g., a pancake lens assembly). Additionally, details of some example pancake lens assemblies may be found at, e.g., U.S. patent application Ser. No. 15/335,807, which is herein incorporated by reference in its entirety.

The optical assembly 180 is configured to operate within a target range of temperature. If some or all of the optical assembly 180 is at a temperature outside of the target range, it can negatively affect performance of the HMD 100. For example, excess heat may affect a shape of an optical element (e.g., change its curvature), thereby distorting and negatively affecting the quality of the image on the electronic display element 160 that is presented to the user wearing the HMD 100. Moreover, in some embodiments, the optical assembly 180 may include folded optical systems (e.g., a pancake lens assembly) that includes one or more optical elements that have coatings that affect polarization in some manner (e.g., a quarter waveplate, a linear polarizer, etc.). Some of these coatings are also designed to work within the target range of temperatures, and may not correctly function (e.g., fully polarize, change polarization, etc.) while at a temperature outside of the target range of temperatures.

The heat management device 165 provides thermal management for the eyecup assembly 145. Enclosed within the front rigid body 105 of the HMD 100, the components of the eyecup assembly are exposed to heat generated by the electronic display element 160. The heat management device 165 mitigates the heat from affecting heat-sensitive components of the eyecup assembly 145, such as the optical assembly 180. The structural components of the heat management device 165 that enable heat dissipation and thermal insulation are explained in further detail below, with respect to FIGS. 2-5C. The heat management device 165 also may provide structural support to the eyecup assembly 145. As seen in FIG. 1B, the electronic display 160 may be coupled to the heat management device 165, such that in the case that the HMD 100 is dropped, the optical assembly is not hit by the electronic display element. The heat management device 165 may also resist structural deflection when formed as a single monolithic piece.

Eyecup Assembly

Figure 2:
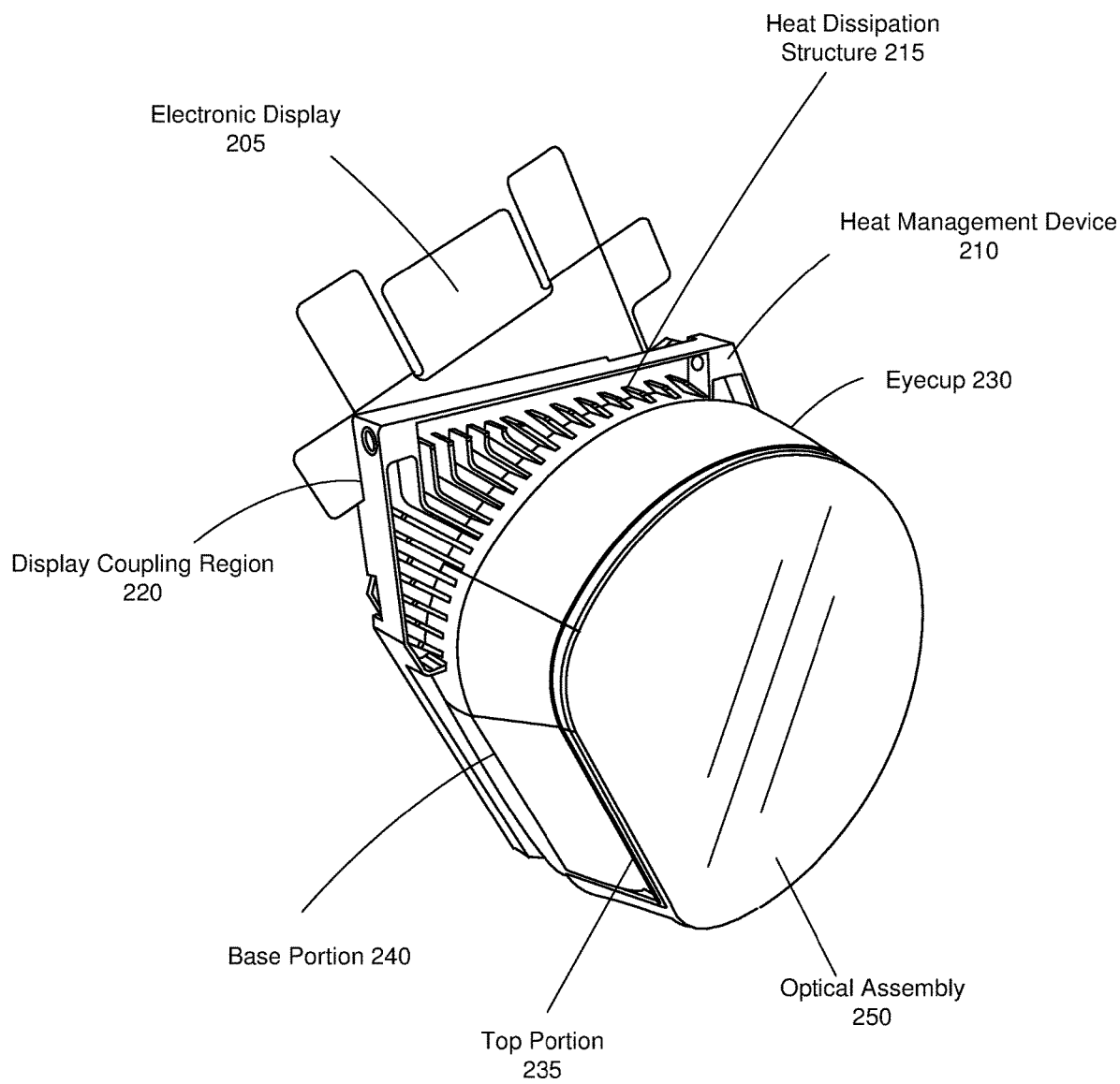
FIG. 2 illustrates a perspective view of an eyecup assembly including a heat management device, in accordance with one or more embodiments.

FIG. 2 illustrates a perspective view of an eyecup assembly 200 including a heat management device, in accordance with one or more embodiments. The eyecup assembly 200 is an embodiment of the eyecup assembly 135. The eyecup assembly 200 is configured to be coupled to a HMD (e.g., the HMD 100) such that the eyecup assembly 200 would provide image light an eyebox (e.g., the eyebox 180) of the HMD. The eyecup assembly 200 includes an electronic display 205, a heat management device 210, an eyecup 230, and an optical assembly 250. In some embodiments, the eyecup assembly 200 may include different components than those described here. Similarly, the functions can be distributed among the components in a different manner than is described here. For example, the heat management device and the eyecup may be a part of a single, monolithic body, rather than distinct components. For purposes of illustration, FIG. 2 shows an eyecup assembly 200 associated with a right eye, but another eyecup assembly, separate from the eyecup assembly 200, may provide image light to a left eye of the user.

The electronic display 220 generates image light for display to the user wearing the HMD 100. The image light generated by the electronic display 205 travels through an aperture (not shown in FIG. 2) in the heat management device 210 to the optical assembly 250. In the process, the electronic display 205 generates heat. The electronic display 205 is an embodiment of the electronic display element 145.

The heat management device 210 provides thermal management by dissipating heat and thermally insulating components, such as the optical assembly 250 from the electronic display 220. The heat management device 210 is an embodiment of the heat management device 155. The heat management device 210 includes a display coupling region 220, where the electronic display 205 couples to the heat management device 210. The heat management device 210 includes a plurality of radiating fins that make up a heat dissipation structure 215, and at least a portion of the heat dissipation structure is positioned adjacent to the electronic display 205. The heat management device 210 also includes an insulating structure (not shown in FIG. 2). The heat dissipation structure is discussed in further detail in FIGS. 4A-I and FIG. 5.

The heat management device 210 may also serve as structural support for the eyecup assembly 200. As shown in FIG. 2, the eyecup assembly 200 is compact, such that the optical assembly 250 is positioned close to the display 205. The heat management device 210 is positioned in between the eyecup 230 and the electronic display 205. In one embodiment, the heat management device 210 mitigates the optical assembly 250 from hitting the display 205, in the case that the HMD 100 is dropped.

The eyecup 230 provides the image light generated by the electronic display 205 to the optical assembly 250. The eyecup 230 is an embodiment of the eyecup 170 in FIG. 1B. The light travels through the aperture of the heat management device 210, through the eyecup 230, and finally reaches the optical assembly 250. The eyecup 230 includes a top portion 235 and a base portion 240. The top portion 235 is a portion of the eyecup 230 that is configured to couple to the optical assembly 250. The base portion 240 is a portion of the eyecup 230 that is configured to couple to the insulating structure on the heat management device 210. The insulating structure thermally insulates the eyecup 230 from the optical assembly 250, which may also generate heat after receiving the image light. The eyecup 230 may be formed from a material that is a thermal insulator, such as plastic, foam, rubber material, or some combination thereof.

The optical assembly 250 provides image light generated by the electronic display 205 to an eye of the user wearing the HMD 100. The optical assembly 250 is an embodiment of the optical assembly 165 in FIG. 1B. The optical assembly 250 may be sensitive to heat. In FIG. 2, the optical assembly 250 is a single optical element, but in other embodiments, the optical assembly 250 may include additional optical elements. The heat management device 210 and the eyecup 230 thermally insulate the optical assembly 250 from the heat generated by the electronic display 205 and/or other components that generate heat (e.g., a processor), and dissipates heat using the heat dissipation structure 215. The heat management device 210 prevents at least some heat from radiating through the structure of the eyecup 230 to the optical assembly 250.

Figure 3:
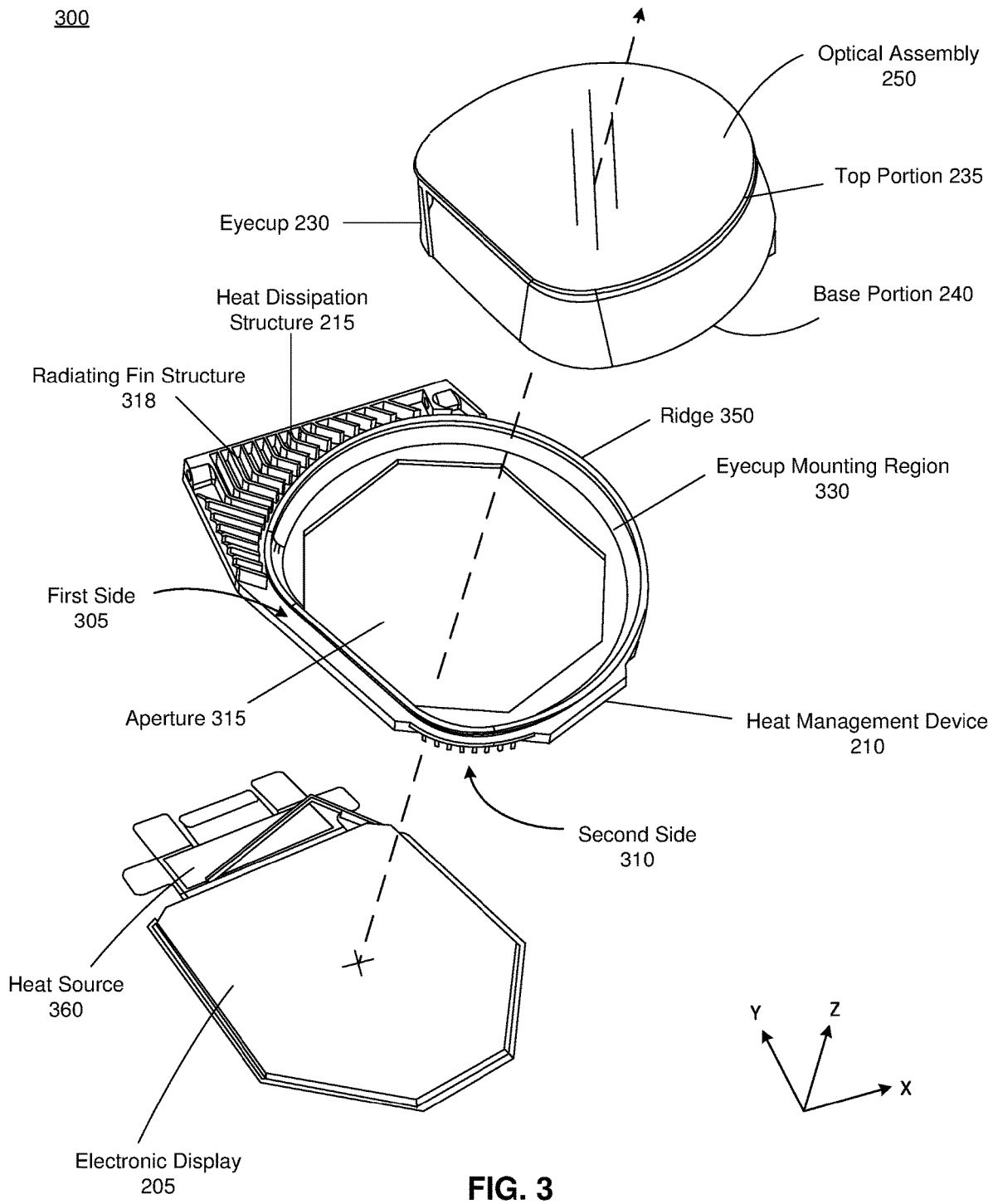
FIG. 3 illustrates an exploded view of the eyecup assembly shown in FIG. 2, in accordance with one or more embodiments.

FIG. 3 illustrates an exploded view 300 of the eyecup assembly 200 shown in FIG. 2, in accordance with one or more embodiments. The exploded view 300 shows individual components of the eyecup assembly 200 (e.g., the electronic display 205, the heat management device 210, and the eyecup 230) separated by some distance along the z axis.

As mentioned above in the description of FIG. 2, the electronic display 205 generates image light for display to the user wearing the HMD 100. The electronic display 205 may include one or more heat source. For example, in the illustrated embodiment, the electronic display 205 includes a heat source 360. A heat source is a component that generates heat as a byproduct of its operation and/or as its primary purpose. A heat source may be, e.g., a backlight (e.g., an array of light LEDs), a processor (e.g., graphics processor), a heater (e.g., to control temperature of light sources), a current driver, some other component that generates heat, or some combination thereof. Note that in FIG. 3, a single heat source 360 is illustrated, but in other embodiments there may be additional heat sources. And in some cases, the additional heat sources may be located outside of the eyecup assembly 200 and/or in other locations within the eyecup assembly 200. In some embodiments, the heat source 360 is a backlight. A backlight backlights a liquid crystal panel to generate an image. Operation of the backlight generates heat. The backlight assembly may include, e.g., one or more light emitting diodes (LEDs), one or more vertical cavity surface emitting lasers (VCSELs), one or more super luminous LEDs (SLEDs), one or more micro-LEDs, some other light source, or some combination thereof The electronic display 205 couples to the second side 310 of the heat management device 210. In one embodiment, it is the heat source 360 portion of the electronic display 205 that couples to the second side 310 of the heat management device 210. The generated image light travels through the heat management device 210 and the eyecup 230 to the optical assembly 250.

The heat management device 210 provides thermal management for the eyecup assembly 200 primarily via a heat dissipation structure 215 and an insulating structure (not shown in FIG. 3). The heat management device 210's body includes a first side 305, a second side 310, an aperture 315, and a heat dissipation structure 215. The first side 305 includes a portion of the heat dissipation structure 215, an eyecup mounting region 330, and a ridge 350. The heat management device 210 may include other components, and functions can be distributed among the components in a different manner than is described here.

The heat management device 210's aperture 315 allows light from the display 205 to pass through the heat management device 210 to reach the optical assembly 250. The aperture 315 is positioned in between the first side 305 and the second side 310 of the heat management device 210. The aperture 315 may be sized to match the size of an emission surface (i.e., portion of the electronic display that emits image light) of the electronic display 205. For example, the aperture may be 30 millimeters wide in diameter. In other embodiments, the aperture 315's size may vary beyond that of the emission surface of the display 205.

In FIG. 3, the heat management device 210 includes a portion of the heat dissipation structure 215, located on a heat dissipation region, to thermally insulate the other components of the eyecup assembly 200 from heat sources within the eyecup assembly 200. The heat dissipation regions may be positioned around the heat management device 210, on both the first side 305 and the second side 310, to maintain a relatively constant thermal gradient throughout the eyecup assembly 200. FIG. 3 shows a portion of the heat dissipation structure 215 at a heat dissipation region on the first side 305 of the heat management device 210. In some embodiments, the heat dissipation regions, on which portions of the heat dissipation structure 215 sit, may be positioned on the heat management device 210 in different locations than described here. For example, the heat dissipation regions may be positioned on only the first side 305 or only on the second side 310 of the heat management device 215.

The heat dissipation structure 215 includes one or more radiating fin structures 318 that direct heat away from the heat source 360 in the eyecup assembly 200. In FIG. 3, the radiating fin structure 318 is positioned on the first side 305 of the heat management device 210. The radiating fin structure includes at least one radiating fin. In other embodiments, the heat dissipation structure 215 may include structures other than radiating fins. The radiating fin structure is described in more detail in FIG. 4A-B and 6.

Once the heat management device 210 couples to the electronic display 205, the heat dissipation structure 215 sits adjacent to a portion of the electronic display 205 and dissipates at least some of the heat generated by the heat source 360. For example, a backlight included in the display 205 may generate heat. An insulating structure (not shown in FIG. 3) insulates the optical assembly 250 and the eyecup 230 from heat generated by the electronic display 205 and/or other heat sources. Included on at least some portion of the eyecup mounting region 330, the insulating structure couples to the eyecup 230. In some embodiments, the display 205 and eyecup 230 may couple to the heat management device 210 via compression, adhesive, or mechanical fasteners, among other coupling techniques. The heat dissipation structure 215 is discussed in more detail with respect to FIGS. 4A-I and FIGS. 5-6.

The first side 305 also includes an eyecup mounting region 330 and ridge 350 that help the eyecup 230 couple to the heat management device 210. As mentioned with respect to FIG. 2, the eyecup top portion 235 couples with the optical assembly 250, while the eyecup base portion 240 couples to the heat management device 210. The eyecup base portion 240 couples to the eyecup mounting region 330, such that a portion of the eyecup 230 rests along the ridge 350.

Heat Management Device

FIGS. 4A-I show different views of the heat management device 210, in accordance with one or more embodiments. The heat management device 210 provides thermal management for an eyecup assembly (e.g., the eyecup assembly 200), insulating other components of the eyecup assembly from heat generated by an electronic display (e.g., the electronic display 205) that sits underneath the heat management device 210.

Figure 4A:
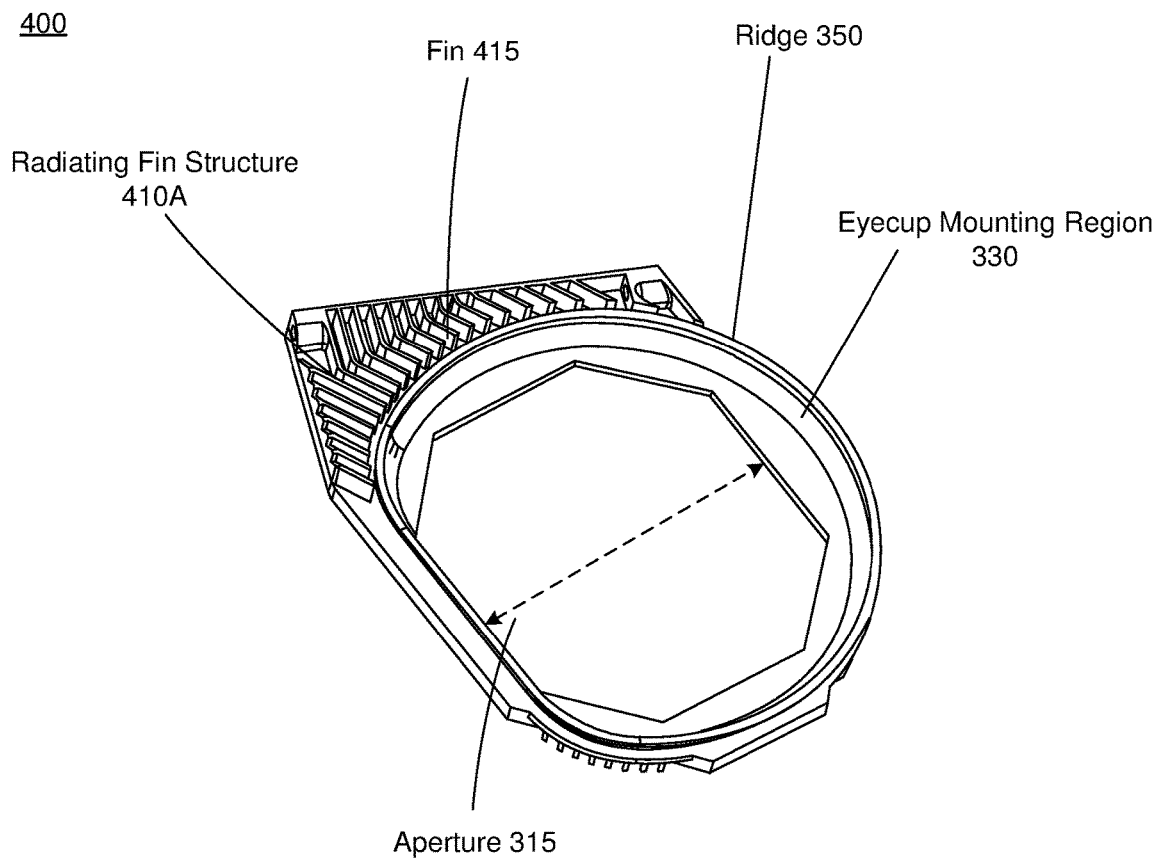
FIG. 4A illustrates a perspective view of a first side of the heat management device shown in FIG. 2, in accordance with one or more embodiments.

FIG. 4A illustrates a perspective view 400 of the first side 305 of the heat management device 210 shown in FIG. 2, in accordance with one or more embodiments. The first side 305 of the heat management device 210 contributes to the thermal management of the eyecup assembly 200. The first side 305 includes a portion of the heat dissipation structure 215 and an insulating structure that redirect heat from one or more heat sources in the eyecup assembly 200 (e.g., the electronic display 205). The first side 305 of the heat management device 210 is formed such that it creates the aperture 315 and includes the eyecup mounting region 330, the ridge 350, the portion of the heat dissipation structure 215, and an insulating structure (not shown in FIG. 4A). The heat dissipation structure 215 in FIG. 4A includes a radiating fin structure 410A.

The heat dissipation structure 215 acts as a heat sink, dissipating heat generated by heat sources within the eyecup assembly 205, such as the electronic display 205. In FIG. 4A, the heat dissipation structure 215 includes the radiating fin structure 410A located at a heat dissipation region. As shown in the exploded view of the eyecup assembly 200 in FIG. 3, at least a portion of the heat dissipation structure 215, including the radiating fin structure 410A, may be adjacent to a heat source 360, such as a backlight that illuminates the electronic display 205. The radiating fin structure 410A dissipates at least some of the heat generated by the electronic display 205. The radiating fin structure 410A is composed of a plurality of fins 415. A fin 415 may be formed from a material that is thermally conductive, such as powdered metal, in order to assist with heat dissipation. FIG. 4A shows the radiating fin structure 410A arranged in a parallel pattern, but in other embodiments, the heat dissipation structure may be arranged differently. For example, the radiating fins may be arranged in a triangular or hexagonal pattern.

The radiating fin structures may be printed (for example, via SLM or DMLS, as described above) to form a single monolithic heat dissipation structure 215. In other embodiments, one or more components of the radiating fin structures are printed individually and are coupled together and/or to other components to form the heat dissipation structure. For example, the entire heat management device 210, including the heat dissipation structure 215, may be manufactured as a single, monolithic piece. In another embodiment, the heat dissipation structure 215 may be printed as a separate piece from the body of the heat management device 210 and then coupled to the heat management device 210. Alternatively, the heat dissipation structure 215 may be printed as multiple, separate pieces and then coupled to the heat management device 210. For example, one or more of the fins 415 of the radiating fin structure may be coupled to the body of the heat management device 210.

The aperture 315 allows image light generated by the electronic display to travel through the eyecup assembly through the heat management device 210, to reach the optical assembly. The eyecup mounting region 330, the ridge 350, and the radiating fin structure 410A surround the aperture 315. The eyecup mounting region 330 is a region of the first side 305 to which an eyecup (e.g., eyecup 230) couples.

The heat management device 210 also includes an insulating structure (not shown in FIG. 4A). The insulating structure is a part of some or all of the eyecup mounting region 330 surrounding the aperture 315 and couples to the eyecup. The insulating structure is explained in further detail with respect to FIG. 5. The ridge 350 helps align the eyecup 230 such that light from the electronic display 205 is directed to the optical assembly. Once coupled to the insulating structure, the base portion (e.g., the base portion 240) of the eyecup rests along the ridge 350.

Figure 4B:
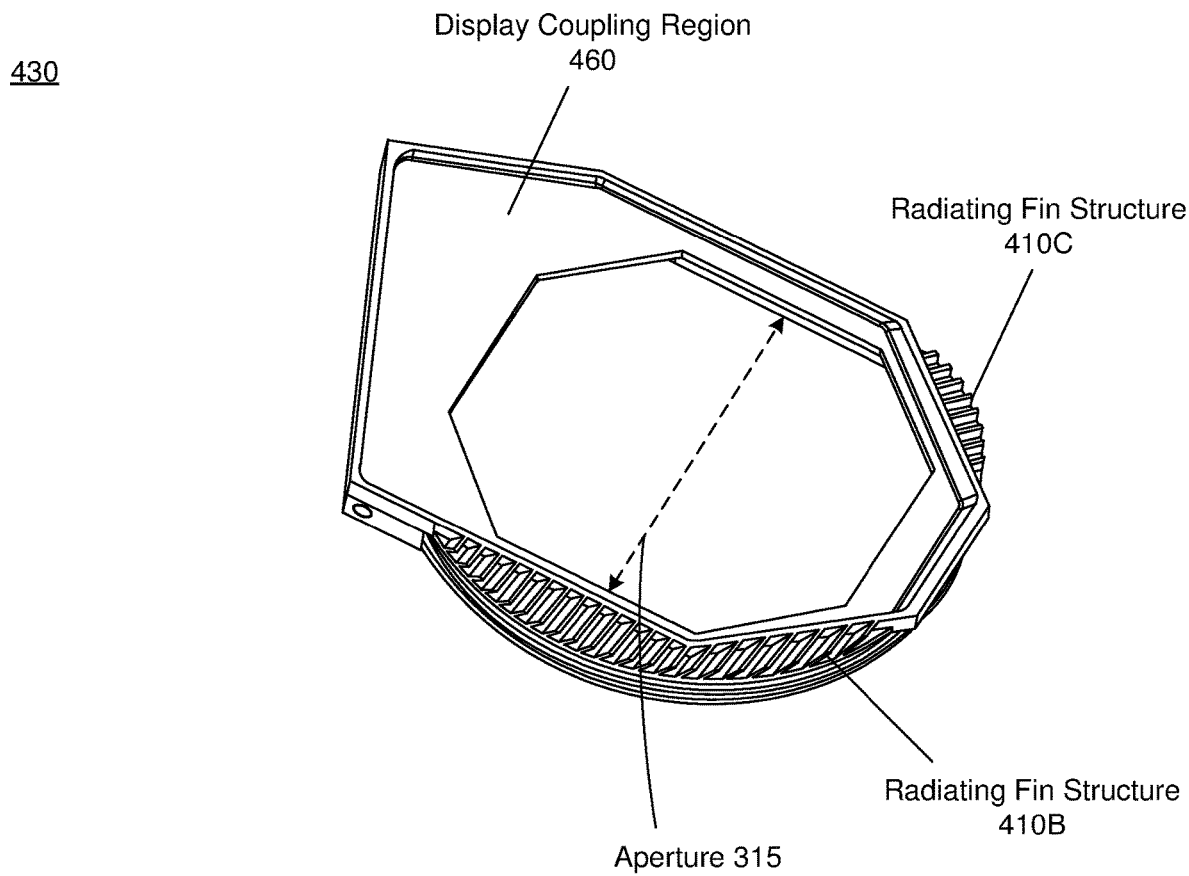
FIG. 4B illustrates a perspective view of a second side of the heat management device shown in FIG. 2, in accordance with one or more embodiments.

FIG. 4B illustrates a perspective view 430 of the second side 310 of the heat management device 210 shown in FIG. 2, in accordance with one or more embodiments. The second side 310 of the management device 210 contributes to the thermal management of the eyecup assembly by redirecting heat from the electronic display via the heat dissipation structure 215. The second side 310 of the heat management device 210 is formed around the aperture 315 and includes the heat dissipation structure 215 and a display coupling region 460. The portions of the heat dissipation structure 215 on the second side 310 include radiating fin structures 410B and 410C.

The heat dissipation structure 215, including the radiating fin structures 410B and 410C serve as heat sinks, dissipating heat generated by heat sources (e.g., the electronic display 205) in the eyecup assembly 200. The radiating fin structures 410B and 410C are embodiments of the radiating fin structures that make up the heat dissipation structure 215. The radiating fin structures 410B and 410C are substantially similar to radiating fin structure 410A. The radiating fin structures 410B and 410C are positioned at heat dissipation regions. The fins (e.g., the fin 415) of the radiating fin structures 410A-C are positioned radially around the aperture 315 of the heat management device 210. The radial fin positions and the distribution of heat dissipation regions enable the heat dissipation structure 215 to direct heat generated by the heat sources away from the heat sensitive components of the eyecup assembly 200.

Figure 4C:
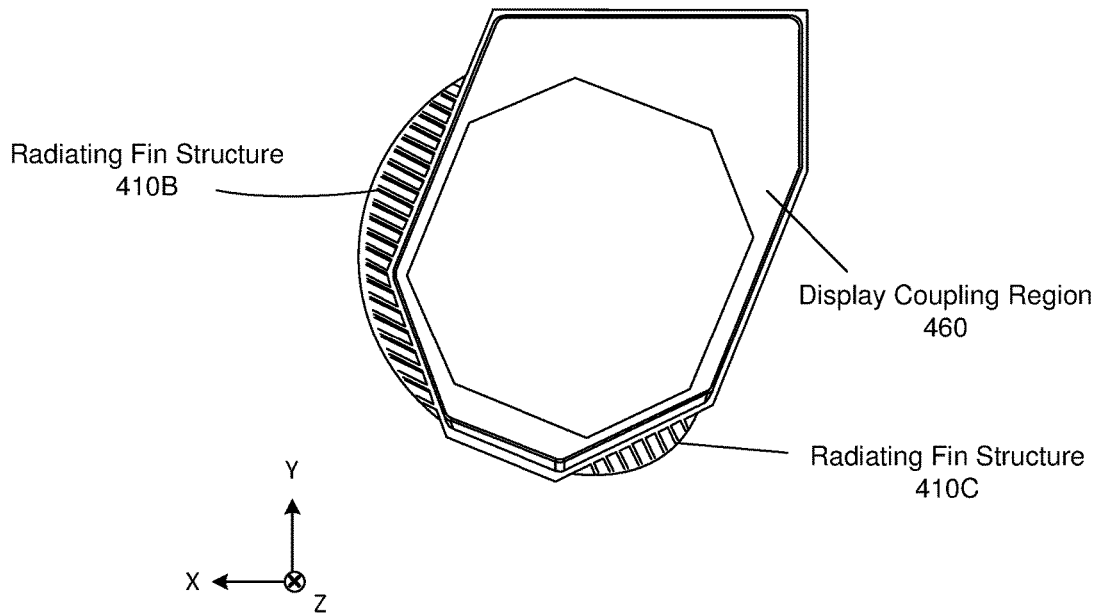
FIG. 4C illustrates a top down view of the second side of the heat management device shown in FIG. 2, in accordance with one or more embodiments.

The display coupling region 460 serves as a region to which the electronic display 205 couples, positioned on the second side 310 of the heat management device 210. In one embodiment, the display coupling region 460 couples to the backlight included in the electronic display. The display 205 may couple to the display coupling region 460 for example, by compression, adhesive, mechanical fasteners, or some combination thereof FIG. 4C illustrates a top down view 440 of the second side 310 of the heat management device 210 shown in FIG. 2, in accordance with one or more embodiments.

Figure 4D:
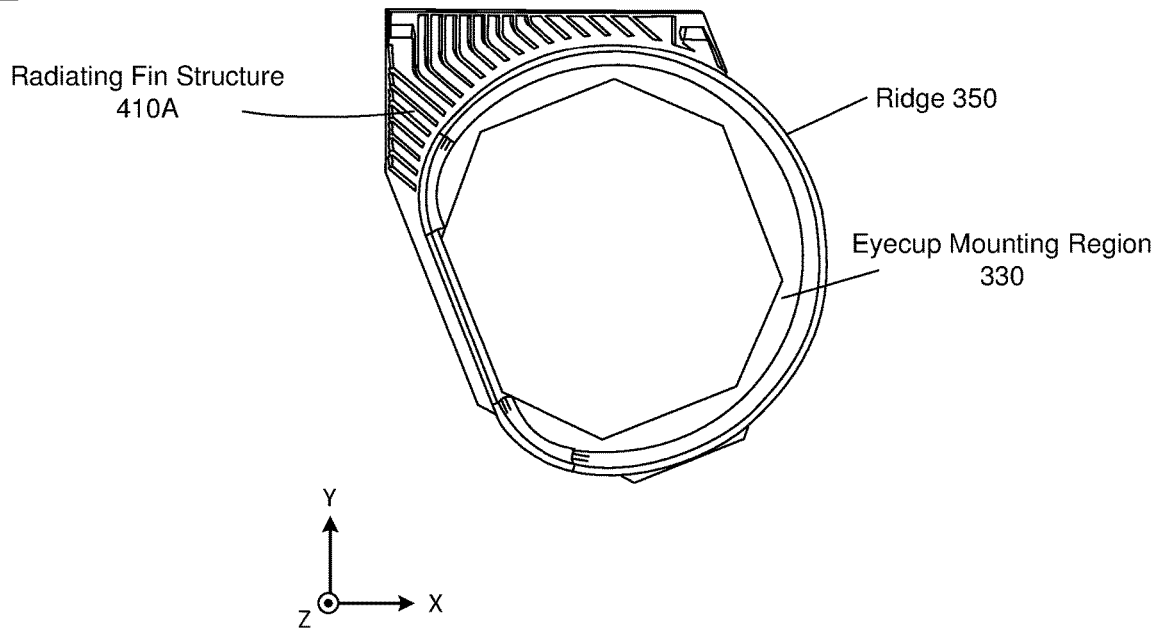
FIG. 4D illustrates a top down view of the first side of the heat management device shown in FIG. 2, in accordance with one or more embodiments.

FIG. 4D illustrates a top down view 450 the first side 305 of the heat management device 210 shown in FIG. 2, in accordance with one or more embodiments.

Figure 4E:
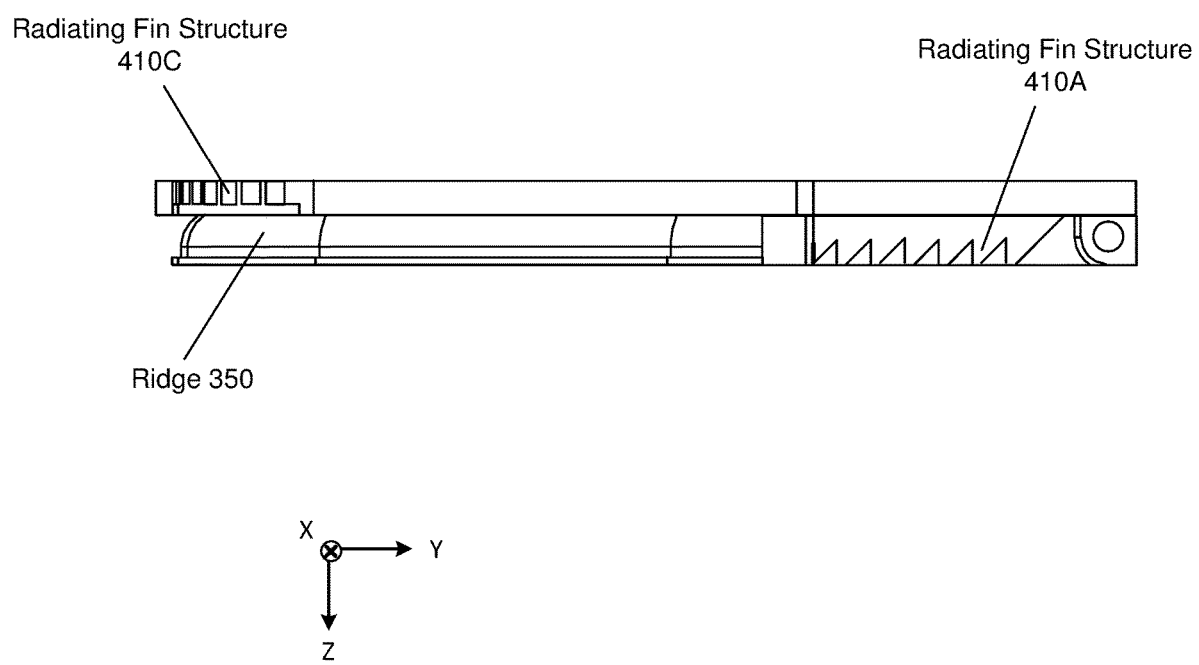
FIG. 4E illustrates a side view of the heat management device shown in FIG. 2, in accordance with one or more embodiments.

FIG. 4E illustrates a side view 470 of the heat management device 210 shown in FIG. 2, in accordance with one or more embodiments.

Figure 4F:
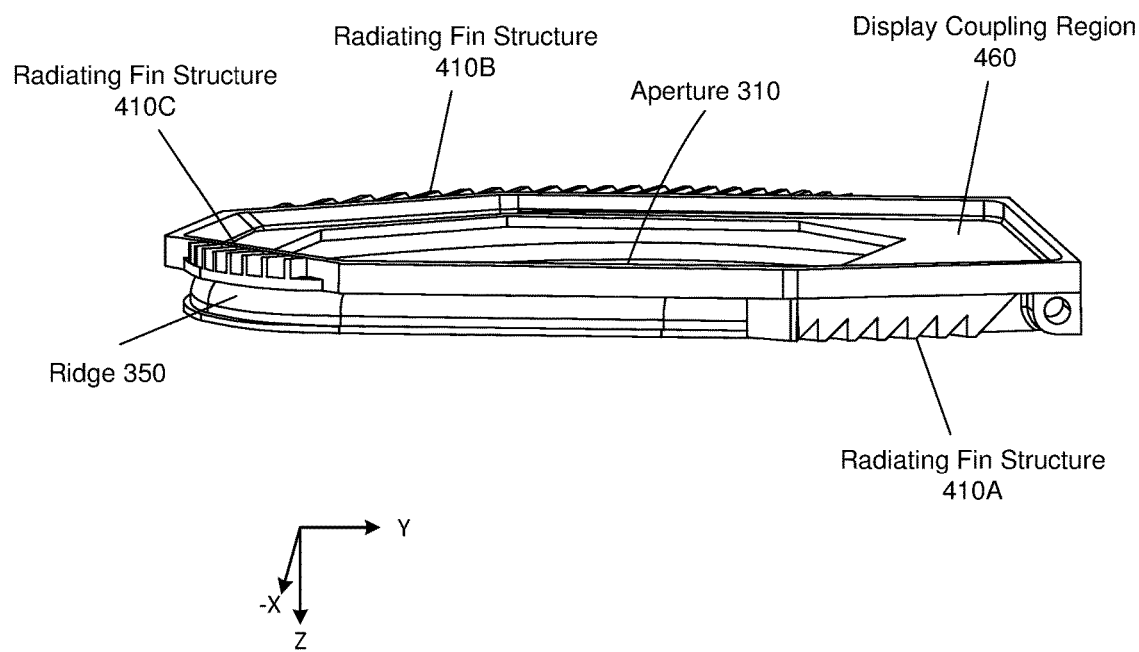
FIG. 4F illustrates a perspective side view of the heat management device shown in FIG. 2, in accordance with one or more embodiments.

FIG. 4F illustrates a perspective side view 475 of the heat management device 210 shown in FIG. 2, in accordance with one or more embodiments.

Figure 4G:
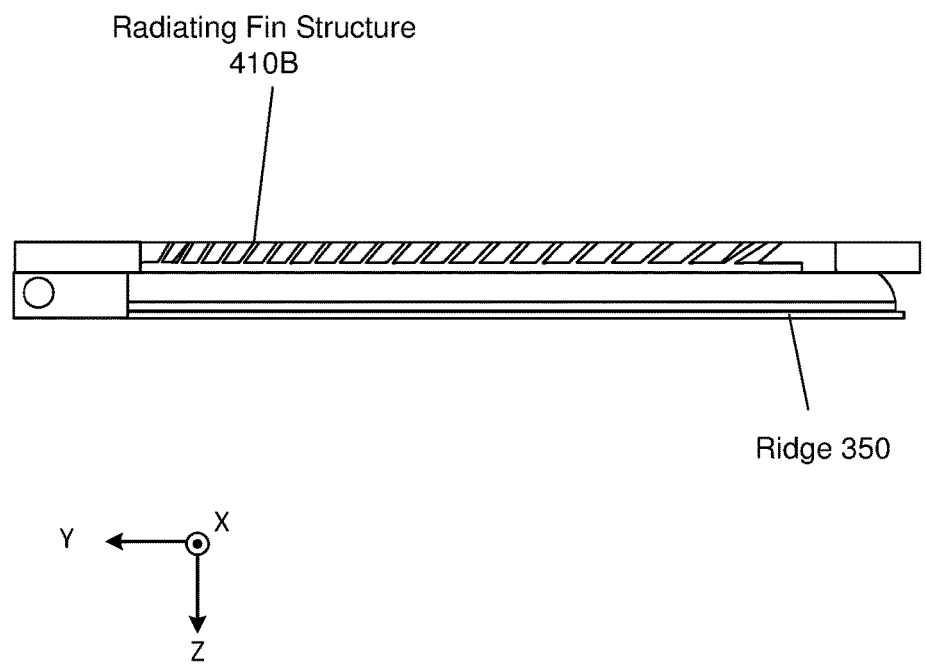
FIG. 4G illustrates another side view of the heat management device shown in FIG. 2, in accordance with one or more embodiments.

FIG. 4G illustrates another side view 480 of the heat management device 210 shown in FIG. 2, in accordance with one or more embodiments.

Figure 4H:
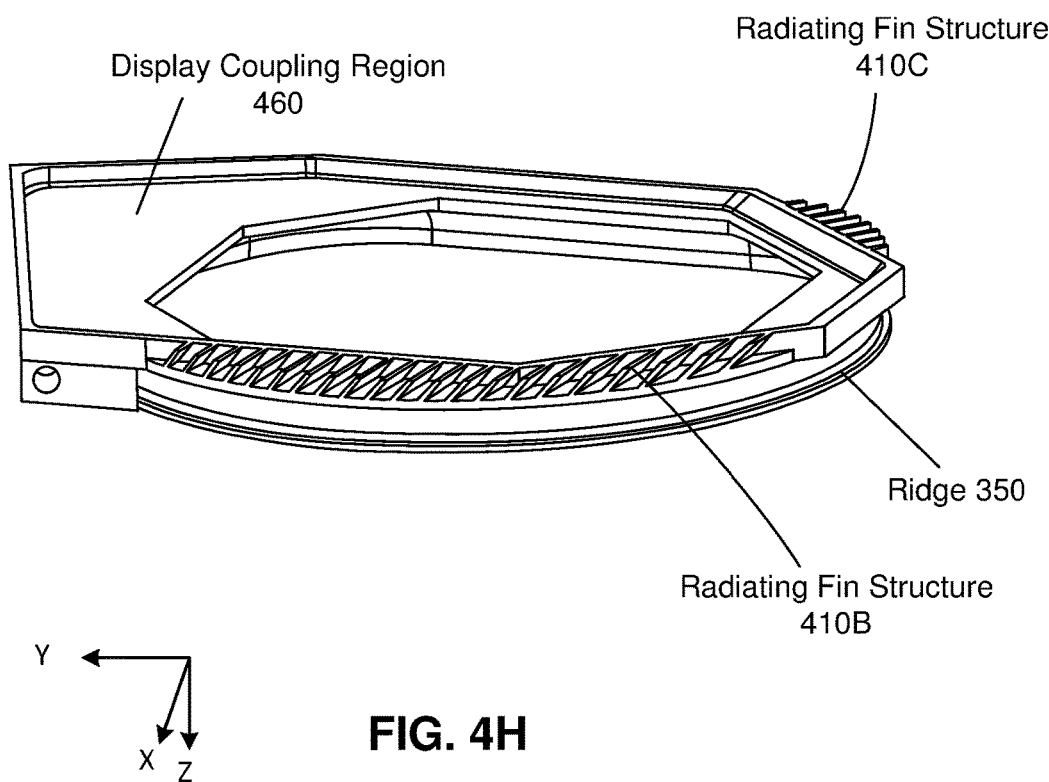
FIG. 4H illustrates a top down perspective view of the second side of the heat management device shown in FIG. 2, in accordance with one or more embodiments.

FIG. 4H illustrates a top down perspective view 485 of the second side 310 of the heat management device 210 shown in FIG. 2, in accordance with one or more embodiments.

Figure 4I:
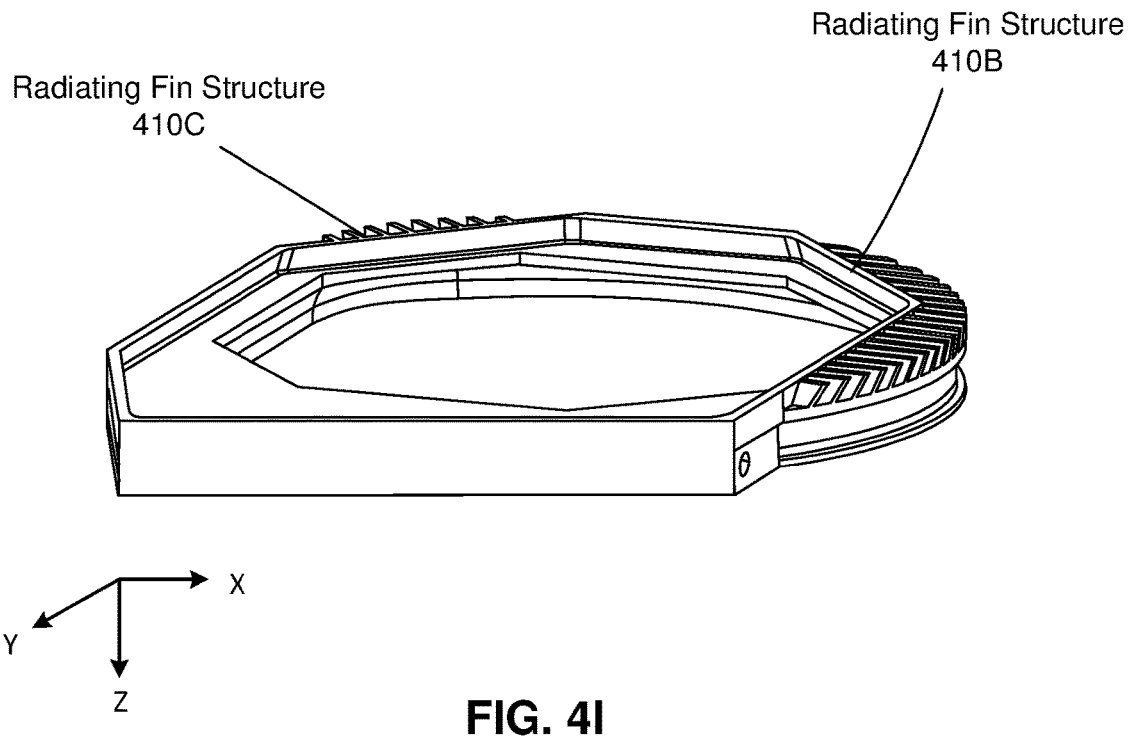
FIG. 4I illustrates another top down perspective view of the second side of the heat management device shown in FIG. 2, in accordance with one or more embodiments.

FIG. 4I illustrates another top down perspective view 490 of the second side 310 of the heat management device 210 shown in FIG. 2, in accordance with one or more embodiments.

Figure 5:
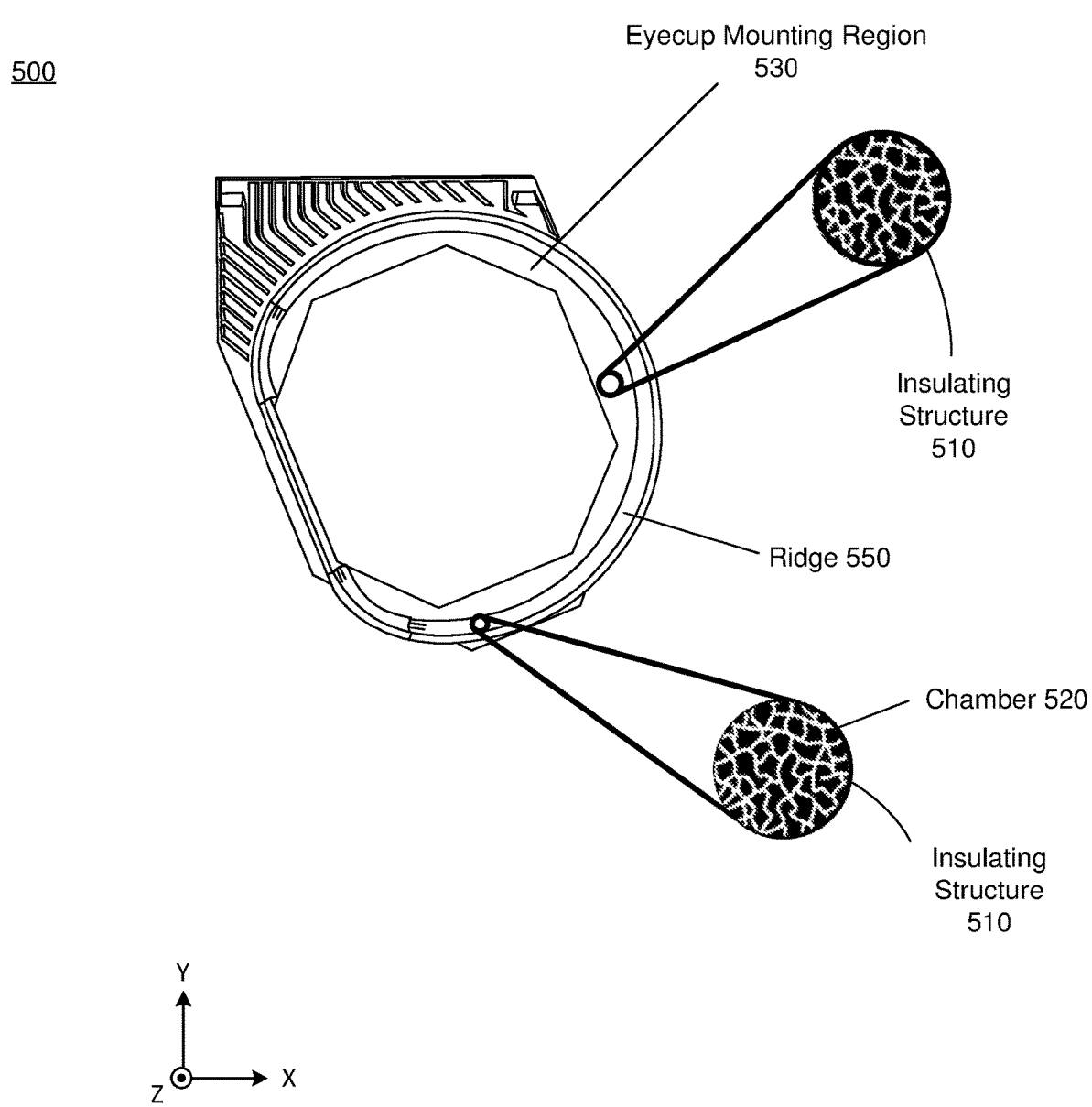
FIG. 5 illustrates a top down view of a first side of a heat management device, including an insulating structure, in accordance with one or more embodiments.

FIG. 5 illustrates a top down view of a first side of a heat management device 500, in accordance with one or more embodiments. The heat management device 500 is an embodiment of the heat management device 210 that includes an insulating structure 510. The eyecup mounting region 530 and the ridge 550 are substantially similar to the eyecup mounting region 330 and the ridge 330 described in FIG. 3, respectively.

The insulating structure 510 helps thermally insulate the components of the eyecup assembly from heat generated by the electronic display 205. The insulating structure 510 may be a part of some or all of the eyecup mounting region 530 around the aperture of the heat management device 500 (e.g., the aperture 315). For example, the insulating structure 510 may have a surface area of 20 cm$^2$ across the heat management device 500. In other embodiments, the insulating structure may also be part of the ridge 550 and/or other parts of the heat management device 510, thereby having a surface area greater than described here.

The insulating structure 510 includes one or more chambers 520 arranged in a quasi-random pattern, in one embodiment. The insulating structure 510 includes 12 chambers per cm$^2$. Each chamber may have a wall to enclosure area ratio of 1.25. The chambers 520 are filled with an insulating substance that has a thermal conductivity of no more than 0.04 Watts/(meter-Kelvin), such as air. At least some heat generated by the electronic display is dissipated by the air, such that the eyecup and the optical assembly are thermally insulated. In other embodiments, the chambers 520 differ in size and structure than described here. The insulating structure may be manufactured of the same material as the body of the heat management device 500 (e.g., plastic, rubber, or some combination thereof). The insulating structure may be printed (e.g., via DMLS or SLM as explained above) as a part of the single, monolithic heat management device. In other embodiments, the insulating structure may be manufactured separately and coupled to the heat management device.

Figure 6:
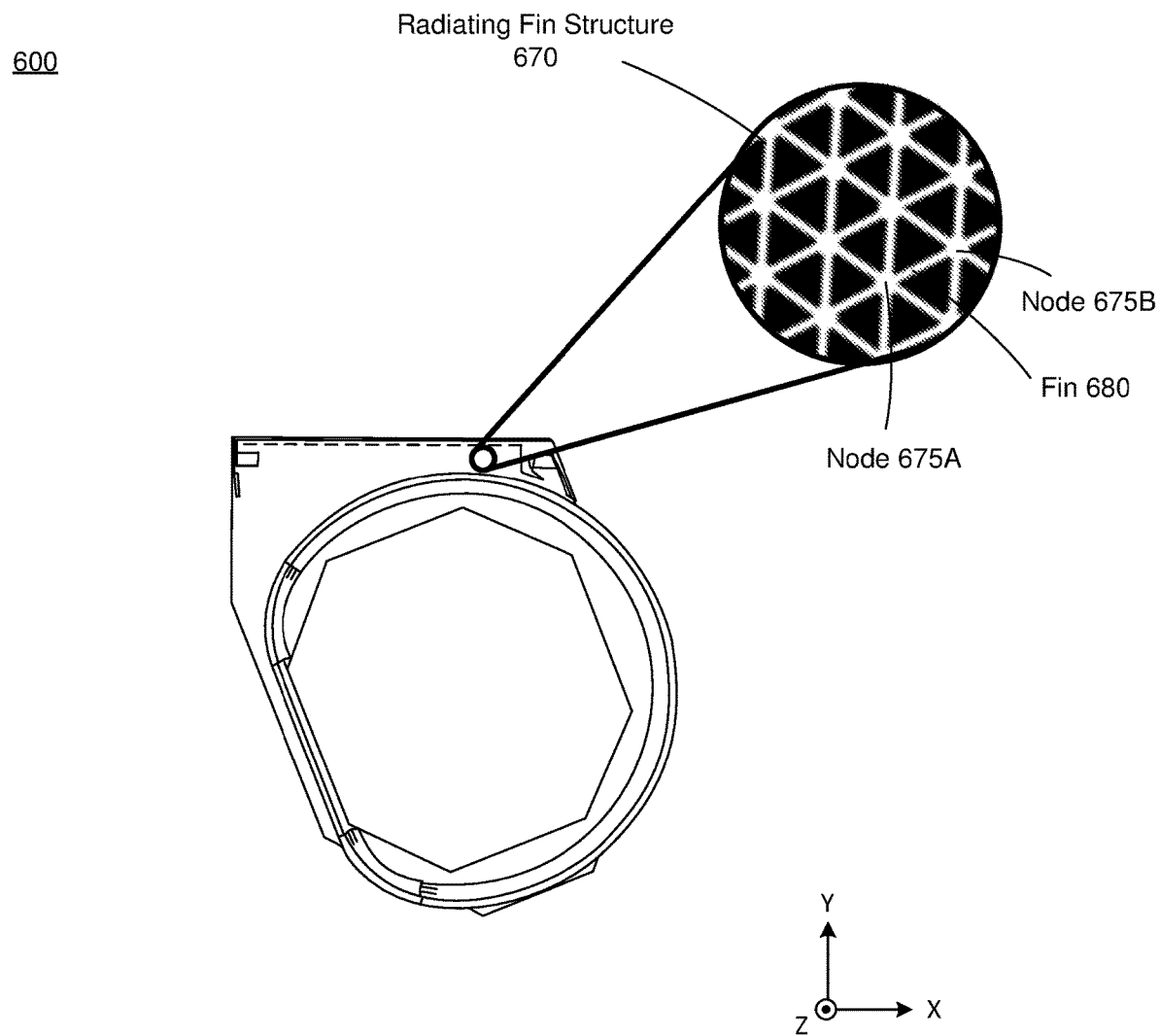
FIG. 6 illustrates another top down view of a first side of a heat management device, in accordance with one or more embodiments.

FIG. 6 illustrates a top down view of a first side of a heat management device 600, in accordance with one or more embodiments. The heat management device 600 is an embodiment of the heat management device 210 and includes a radiating fin structure 670.

The radiating fin structure 670 enables the dissipation of heat generated by heat sources within the eyecup assembly that the heat management device 600 is located in (e.g., the eyecup assembly 200). The radiating fin structure 670 is an embodiment of the heat dissipation structure 215. The radiating fin structure 670 includes a plurality of fins, such as fin 680. A fin 680 may be formed from a material that is thermally conductive, such as powdered metal, to assist with heat dissipation. The fins (e.g., fin 680) are arranged to form a triangular and/or hexagonal structural pattern, filled with an insulating substance such as air. The triangular and/or hexagonal structural pattern is made up of a plurality of nodes interconnected by the fins. In FIG. 6, the radiating fin structure 670 includes a node 675A and a node 675B, connected by fin 680. The radiating fin structure 670 is distributed throughout the heat management device 600 on heat dissipation regions, similar to where radiating fin structures 410A-C are positioned on heat management device 210 in FIGS. 3-4B. The radiating fin structure 670 may be printed (for example, via SLM or DMLS, as described above) to form the single, monolithic heat dissipation structure 600, similar to the heat dissipation structure 215. In other embodiments, one or more components of the radiating fin structure 670 are printed individually and are coupled together and/or to other components to form the heat dissipation structure 600. In other embodiments, the structure and location of the radiating fin structure 670 may differ from what is described here Additional Configuration Information The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like, in relation to manufacturing processes.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described (e.g., in relation to manufacturing processes.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A heat management device comprising:
   a body that includes a first side and a second side that is opposite the first side with an aperture between a portion of the first side and the second side, the body including:
      a display coupling region on the second side of the body, the display coupling region configured to couple the heat management device to an electronic display;
      a heat dissipation structure that is adjacent to at least a portion of the display coupling region, and is configured to dissipate heat generated by the electronic display;
      an insulating structure on the first side of the body, the insulating structure configured to thermally insulate an eyecup from the electronic display, and the insulating structure is configured to couple to the eyecup in a manner such that it receives light from the electronic display through the aperture.

2. The heat management device of claim 1, wherein the electronic display includes a backlight and the heat dissipation structure comprises:
   a radiating fin structure that includes a plurality of thermally conductive fins, the plurality of thermally conductive fins positioned on at least one of the first side and the second side of the heat dissipation structure to dissipate heat generated by the backlight.

3. The heat management device of claim 1, wherein the insulating structure includes a plurality of chambers arranged in a quasi-random pattern.

4. The heat management device of claim 3, wherein the chambers are filled a substance that has a thermal conductivity of no more than 0.04 Watts/(meter-Kelvin).

5. The heat management device of claim 1, wherein the eyecup is coupled to an optical assembly that includes at least one lens, and the insulating structure is configured to thermally insulate the eyecup from the at least one lens.

6. The heat management device of claim 5, wherein the eyecup is formed from a material that is a thermal insulator.

7. The heat management device of claim 1, wherein the body is three dimensionally (3D) printed such that the body is monolithic.

8. An eyecup assembly comprising:
   an electronic display element;
   an eyecup;
   an optical assembly coupled to the eyecup;
   a heat management device comprising:
      a body that includes a first side and a second side that is opposite the first side with an aperture between a portion of the first side and the second side, the body including:
         a display coupling region on the second side of the body, the display coupling region configured to couple the heat management device to the electronic display;
         a heat dissipation structure that is adjacent to at least a portion of the display coupling region, and is configured to dissipate heat generated by the electronic display;
         an insulating structure on the first side of the body, the insulating structure configured to thermally insulate the eyecup from the electronic display, and the insulating structure is configured to couple to the eyecup in a manner such that it receives light from the electronic display through the aperture.

9. The eyecup assembly of claim 8, wherein the eyecup assembly is a component of a head-mounted display (HMD).

10. The eyecup assembly of claim 8, wherein the electronic display includes a backlight and the heat dissipation structure comprises:
   a radiating fin structure that includes a plurality of thermally conductive fins arranged in a parallel pattern, triangular pattern, or a hexagonal pattern, the plurality of thermally conductive fins positioned on at least one of the first or second side of the heat dissipation structure to dissipate heat generated by the backlight.

11. The eyecup assembly of claim 8, wherein the insulating structure includes a plurality of chambers arranged in a quasi-random pattern.

12. The eyecup assembly of claim 8, wherein the chambers are filled a substance that has a thermal conductivity of no more than 0.04 Watts/(meter-Kelvin).

13. The eyecup assembly of claim 8, wherein the eyecup is coupled to an optical assembly that includes at least one lens, and the insulating structure is configured to thermally insulate the eyecup from the at least one lens.

14. The eyecup assembly of claim 8, wherein the eyecup is formed from a material that is a thermal insulator.

15. The eyecup assembly of claim 8, wherein the body is 3D printed such that the body is monolithic.

16. A method comprising:
forming a monolithic body that includes a first side and a second side that is opposite the first side and forms an aperture, forming the monolithic body including:
- forming a display coupling region on the second side of the monolithic body, the display coupling region configured to couple the heat management device to an electronic display;
- forming a heat dissipation structure that is adjacent to at least a portion of the display coupling region, and is configured to dissipate heat generated by the electronic display;
- forming an insulating structure on the first side of the body, the insulating structure configured to thermally insulate an eyecup from the electronic display, and the insulating structure is configured to couple to the eyecup in a manner such that the eyecup receives light from the electronic display through the aperture.

17. The method of claim 16, wherein forming the heat dissipation structure comprises:
forming a radiating fin structure that includes a plurality of thermally conductive fins, the plurality of thermally conductive fins positioned on at least one of the first side and the second side of the heat dissipation structure to dissipate heat generated by the backlight.

18. The method of claim 16, further comprising forming an insulating structure that includes a plurality of chambers arranged in a quasi-random pattern.

19. The method of claim 18, wherein the chambers are filled a substance that has a thermal conductivity of no more than 0.04 Watts/(meter-Kelvin).

20. The method of claim 16, further comprising coupling the eyecup to an optical assembly that includes at least one lens, and the insulating structure is configured to thermally insulate the eyecup from the at least one lens.

* * * * *